Patented May 9, 1933

1,907,834

UNITED STATES PATENT OFFICE

LUCAS P. KYRIDES, OF ST. LOUIS, MISSOURI, ASSIGNOR TO MONSANTO CHEMICAL WORKS, OF ST. LOUIS, MISSOURI, A CORPORATION OF MISSOURI

METHOD OF DEHYDRATING ALCOHOLS

No Drawing.   Application filed September 28, 1929. Serial No. 396,008.

This invention relates to the dehydration of hydrous alcohol mixtures to form what are commonly referred to as absolute or commercial absolute alcohols.

Large quantities of commercial absolute alcohols, including the ethyl and iso-propyl alcohols, are employed in commerce in many varied capacities. Heretofore it has been customary to manufacture the alcohol from its constant boiling hydrous mixture by treating the same with any one or more of a large variety of dehydrating compositions. Among these may be mentioned potassium carbonate, quick lime, anhydrous copper sulphate, glycerine, and mixtures of glycerine and potassium carbonate. Recently it has been suggested that a mixture of potassium carbonate and glycol, or glycol alone, be employed for this purpose. Other processes not dependent upon the hygroscopic character of chemical reagents have been employed. Among these may be mentioned the use of benzene, which forms azeotropic mixtures that may be separated to obtain the absolute alcohol.

While these processes have been employed successfully, the cost of operation is high compared with the value of the product being treated, the recovery of the dehydrating ingredients is frequently involved and expensive, necessitating an extensive outlay of equipment, and the operations are otherwise cumbersome and unsatisfactory. According to the present invention, I have provided a process which may be operated continuously or intermittently and which is particularly suited to cyclic operations. The principles involved are such as to afford a wide choice of reacting ingredients, thereby enabling one to operate successfully with relatively cheap or readily adaptable materials.

My invention is based upon the following reactions:

(A)   $ROH + MOH \rightleftharpoons ROM + H_2O$ where "R" represents the residue of mono or polyhydric alcohol and "M" represents an alkali or alkaline earth metal. A specific example of this reaction may be represented as follows:

Ethylene glycol + caustic soda →
                    sodium glycolate + water.

The alcoholate may be made in the manner disclosed in U. S. Patent 1,712,830. The resulting metal alcoholate, whether completely or only partially reacted, and which may include unreacted alcohol, is mixed with a hydrous alcohol product whereupon the following reaction takes place:

(B)   $ROM + (R^1OH + H_2O) - ROH + MOH + R^1OH$ where $(R^1OH + H_2O)$ represents a hydrous alcohol mixture which is difficult, if not impossible, to dehydrate by ordinary distilling operations. The resulting reacted mixture is distilled whereby the dehydrated alcohol is separated. After substantially all of the product is thus recovered, the heating is continued to distill off the water, as is represented by reaction (A) above. The distillation is performed advantageously at subatmospheric pressures.

According to this invention, one may employ alcohols, including phenolic bodies, which form metal alcoholates, or phenolates. These include the monohydric as well as the polyhydric, the aliphatic as well as the aromatic (phenols), and the cyclic as well as the open chain alcohols. Specific examples include phenol, xylenol, amyl alcohol, cyclohexanol, benzyl alcohol, ethylene glycol, trimethylene glycol, glycerol and others. The higher boiling alcohols, such as those enumerated, are preferred for reaction (A). However, the underlying principles of the invention, according to which a metal alcoholate is reacted with a hydrous alcohol mixture, are not so limited.

An embodiment of my invention, according to which ethylene glycol is employed as the alcohol and caustic soda as the metal for reaction (A), is hereinafter set forth. Two mols of glycol are heated with one mol of caustic soda until substantially all of the water of reaction represented by reaction (A) is removed. The excess glycol assures a fluid product. Enough ethyl alcohol (92%) is then added for the water therein to react with 80% of the metal alcoholate present. The water in the grain alcohol decomposes the sodium glycolate as is indicated by reaction (B). The reaction requires no appreciable time to complete itself and the mixture may be distilled immediately, the distillate thus obtained varying between 98.2 and 98.5% alcohol. This distillate may be subjected to a second treatment which results in a product containing well over 99% of pure alcohol. Results obtainable by varying the ratio of the hydrous alcohol to the metal alcoholate are hereinafter set forth:

| Ratio mols water present in hydrous alcohol to mols of sodium glycolate | Volume percent alcohol product in distillate |
|---|---|
| 0.8:1 | 98.2 |
| 0.6:1 | 98.8 |
| 0.4:1 | 98.8 |
| 0.2:1 | 99.1 |

As indicated above, the glycol may be substituted by monohydric as well as other polyhydric compositions which form metal alcoholates and undergo decomposition in the presence of water. The following results have been obtained, using the procedure described in connection with glycol, wherein the glycol is substituted by other alcohols:

| Alcohols | Volume percent of alcohol product |
|---|---|
| Glycerine | 97.9 |
| Benzyl alcohol | 97.6 |
| Cyclohexanol | 97.0 |
| Amyl alcohol | 97.0 |
| Xylenol | 97.5 |
| Phenol | 97.2 |

The metal oxide or hydroxide employed may be of the alkali or alkaline earth origin. Because of its reactivity, stability, as well as the ease with which its alcoholates may be treated, I employ sodium hydroxide. It is understood, however, that potassium, lithium, calcium, or other metallic oxides or hydroxides may be employed within the spirit of this invention.

The results hereinabove set forth pertain specifically to the dehydration of ethyl alcohol. The principles, however, apply to other hydrous alcohol mixtures, as for example iso-propyl and tertiary butyl alcohols.

Inasmuch as the physical constant tables are not available to interpret the gravity readings in percent of alcohol, the specific gravities are hereinafter set forth to indicate the measure of dehydration. Sodium glycolate made by reacting one mol of caustic soda with two mols of glycol and distilling off the water in the manner described above, and tertiary butyl alcohol, having a gravity of .8056 at 25° C. and containing approximately 11.7% water are mixed in the proportion of 28.5 parts sodium glycolate and 24 parts alcohol. The distillate obtained from this mixture has a specific gravity of .7849, which may be subjected to a second dehydrating treatment to give a product having a specific gravity at 25° C. of .7825. The specific gravity of anhydrous tertiary alcohol at 25° C. is given as .780.

Iso-propyl alcohol may be treated in a manner analogous to that set forth in connection with tertiary butyl. The constant boiling mixture of iso-propyl alcohol and water contains approximately 89% alcohol and has a sp. gr. of .8088 at 25° C., whereas the anhydrous iso-propyl alcohol has a sp. gr. of .789 at 20° C. A single dehydration resulted in a product having a sp. gr. of .7871 at 25° C., indicating that the product is substantially anhydrous.

From the disclosures hereinabove set forth, it will be apparent to those skilled in the art that the principles underlying the invention embrace broadly the reaction of a metal alcoholate with a hydrous alcohol mixture followed by the separation, as by distillation, of the resulting dehydrated alcohol. These principles may be applied to the dehydration of any inert hydrous mixture at a low cost and with but a small outlay of equipment. The operations are easily controlled and the principles may be readily applied either to a batch or a continuous operation.

While there are described several embodiments of the principles of my invention and I have indicated the manner in which these principles may be varied, it will be apparent to those skilled in the art that the principles may be applied in other ways without departing from the spirit of this invention and I desire therefore that the examples be considered as exemplary of the invention rather than as limiting the scope thereof. The term "alcoholate" is employed generically to embrace phenolates, as well as the salts of cyclic or open chain alcohols.

What I claim is:

1. The method of manufacturing absolute alcohol from a hydrous composition containing the same which comprises reacting an alcohol with caustic to form an alcoholate, removing the water therefrom, adding the hydrous composition containing the alcohol, distilling the resulting dehydrated alcohol product and again forming the alcoholate.

2. The method of manufacturing absolute alcohol which comprises reacting glycol with an alkali to form substantially anhydrous alkali glycolate, mixing a hydrous alcohol composition therewith, distilling the alcohol from the resulting mixture and heating the residue whereby water is driven off thereby regenerating a substantially anhydrous alkali glycolate.

3. The method of manufacturing absolute alcohol which comprises reacting benzyl alcohol with an alkali to form substantially anhydrous alkali benzylate, mixing a hydrous alcohol composition therewith, distilling the alcohol from the resulting mixture and heating the residue at sub-atmospheric pressure, whereby the water is driven off, thereby regenerating the anhydrous alkali benzylate.

4. In the manufacture of absolute alcohol an operating cycle including the following steps: heating an alcohol with an alkali to form the alcoholate, mixing a hydrous alcohol with the alcoholate and separating the resulting anhydrous alcohol from the mixture.

5. In the manufacture of absolute alcohol an operating cycle including the following steps: heating glycol with an alkali to form the alkali glycolate, mixing a hydrous alcohol with the glycolate and separating the resulting anhydrous alcohol from the mixture.

6. The method of manufacturing absolute alcohol from a hydrous alcohol that comprises mixing an alkali polyhydric alcoholate with the hydrous alcohol whereby the water present reacts with the alcoholate, distilling off absolute alcohol, subsequently reforming the alcoholate by distilling off the water and repeating the cycle.

7. The method of manufacturing absolute alcohol from a hydrous alcohol that comprises mixing an alkali polyhydric alcoholate with the hydrous alcohol whereby the water present reacts with the alcoholate, distilling off absolute alcohol, subsequently reforming the alcoholate by distilling off the water under reduced pressure and repeating the cycle.

8. The method of manufacturing absolute ethyl alcohol from a hydrous alcohol that comprises mixing an alkali polyhydric alcoholate with the hydrous alcohol whereby the water present reacts with the alcoholate, distilling off absolute ethyl alcohol, subsequently reforming the alcoholate by distilling off the water and repeating the cycle.

In testimony whereof, I affix my signature.

LUCAS P. KYRIDES.